US011635125B2

United States Patent
Cadalen et al.

(10) Patent No.: US 11,635,125 B2
(45) Date of Patent: Apr. 25, 2023

(54) DRIVING DEVICE

(71) Applicant: THALES, Courbevoie (FR)

(72) Inventors: François Cadalen, Sophia Antipolis (FR); Yohann Fraisse, Sophia Antipolis (FR); François Warnan, Sophia Antipolis (FR)

(73) Assignee: THALES, Courbevoie (FR)

( * ) Notice: Subject to any disclaimer, the term of this patent is extended or adjusted under 35 U.S.C. 154(b) by 584 days.

(21) Appl. No.: 16/473,976

(22) PCT Filed: Dec. 27, 2017

(86) PCT No.: PCT/EP2017/084615
§ 371 (c)(1),
(2) Date: Jun. 26, 2019

(87) PCT Pub. No.: WO2018/122243
PCT Pub. Date: Jul. 5, 2018

(65) Prior Publication Data
US 2019/0338840 A1 Nov. 7, 2019

(30) Foreign Application Priority Data
Dec. 27, 2016 (FR) ....................... 1601869

(51) Int. Cl.
*F16H 25/20* (2006.01)
*F16B 2/06* (2006.01)
(Continued)

(52) U.S. Cl.
CPC .............. *F16H 25/20* (2013.01); *F16B 2/065* (2013.01); *G01B 21/02* (2013.01); *G01B 21/16* (2013.01)

(58) Field of Classification Search
CPC ......... F16H 25/20; F16B 2/065; G01B 21/00; G01B 21/02; G01B 21/16; G01B 21/10;
(Continued)

(56) References Cited

U.S. PATENT DOCUMENTS 3,220,514 A  11/1965 Erickson
4,241,813 A  12/1980 Van De Sompele
(Continued)

FOREIGN PATENT DOCUMENTS

EP  2 210 767 A1  7/2010
EP  3 015 740 A2  5/2016
(Continued)

*Primary Examiner* — Son T Le
*Assistant Examiner* — Matthew W. Baca
(74) *Attorney, Agent, or Firm* — BakerHostetler

(57) ABSTRACT

A driving device includes a frame, a screw-nut system comprising a threaded rod and a first nut helicoidally connected to the threaded rod, the threaded rod being connected to the frame by a pivot connection that allows the threaded rod to rotate with respect to the frame about a longitudinal axis of the threaded rod, a first position sensor making it possible to detect a limit position of the first nut along the longitudinal axis, the first position sensor comprising a first part and a second part, the first position sensor being sensitive to a variation in a distance between the first part and the second part of the first position sensor along the axis, the first part being fixed to the first nut and the second part being connected to the threaded rod without passing via the pivot connection and in such a way that rotation of the threaded rod about the longitudinal axis leads to a variation in the distance between the first part and the second part of the first position sensor along the longitudinal axis.

19 Claims, 6 Drawing Sheets

(51) Int. Cl.
*G01B 21/02* (2006.01)
*G01B 21/16* (2006.01)

(58) Field of Classification Search
CPC .......... G01B 21/12; H01H 3/16; H01H 3/264; H01H 1/12
USPC ....................................................... 74/89.23
See application file for complete search history.

(56) References Cited

U.S. PATENT DOCUMENTS

| | | | |
|---|---|---|---|
| 5,890,585 A * | 4/1999 | Nakamura | H01H 3/16 200/47 |
| 8,136,715 B2 * | 3/2012 | Nunnery | B23K 37/0531 228/212 |
| 2005/0173994 A1 | 8/2005 | Pfister et al. | |
| 2009/0199610 A1 | 8/2009 | Sato et al. | |

FOREIGN PATENT DOCUMENTS

| | | |
|---|---|---|
| JP | S53-106072 A | 9/1978 |
| JP | S53-106072 A | 9/1978 |
| WO | 2013/027197 A2 | 2/2013 |

\* cited by examiner

DRIVING DEVICE

CROSS-REFERENCE TO RELATED APPLICATIONS

This application is a National Stage of International patent application PCT/EP2017/084615, filed on Dec. 27, 2017, which claims priority to foreign French patent application No. FR 1601869, filed on Dec. 27, 2016, the disclosures of which are incorporated by reference in their entirety.

FIELD OF THE INVENTION

The present invention relates to nut-driving devices comprising a screw-nut system. In devices of this type, the rotation of a threaded rod causes the translational movement of a nut, connected to the threaded rod by a helicoidal connection, along the longitudinal axis of the rod.

BACKGROUND

This type of device is implemented in particular in detection devices for helicopter-borne warfare against submarine threats, in which an antenna for detecting submarine threats is suspended from an aerial platform such as an aircraft which makes it possible to dip the antenna. The antenna comprises the emitters and receivers per se, and potentially electronic equipment associated with the emitters and receivers. It may also comprise environmental sensors. Moreover, on board the aerial platform, the detection device comprises equipment required for generating the acoustic signals and for processing the received acoustic data.

An example of a detection device is shown in FIG. 1. It comprises a winch 100 designed to be installed in an aerial platform. The airborne warfare device comprises an antenna 101 suspended at the end of an electric/hoisting cable 102 of the winch 100, possibly provided with a funnel 103 as is the case in FIG. 1. The winch 100 is designed to deploy and recover the antenna 101. In FIG. 1, the winch 100 is secured to a floor 200 of an aerial platform. The electric/hoisting cable 102 serves to carry signals and the electrical energy required for the acoustic emission and/or the operation of the receivers. Unwinding the cable 102 using the winch 100 lowers the antenna 101 through the funnel 103 (if present) and into the water. Hauling in the cable 102 serves to raise the antenna 101 into the aerial platform within the funnel 103 (if present) as shown in FIG. 1.

The antenna 101 is in the form of an essentially cylindrical elongate dome. It comprises an elongate body 112 having an outer circumference of essentially circular cross section in a plane perpendicular to the longitudinal axis z of the antenna 101. The elongate body 112 is surrounded by a protective structure (or "bumper") 113 having an outer circumference of essentially circular cross section in a plane perpendicular to the longitudinal axis z of the antenna 101. The outer circumference of the protective structure 113 and the outer circumference of the elongate body 112 are essentially concentric. When the antenna 101 is suspended by its own weight from the cable 102, the latter also extends along the longitudinal axis z.

Keeping the antenna 101 in place in the aerial platform solely by means of the cable 102 does not make it possible to obtain an adequate level of safety when the aerial platform is in transit, in particular over populated areas. The cable 102 may break, it may be cut accidentally by the pyrotechnic safety cutter, the brake on the winch 100 may fail and accidentally release the cable. The loss of the antenna 101 represents a considerable financial loss but above all its large mass could fall into the sea or to the ground causing serious material or human damage.

The position of the antenna 101 with respect to the winch 100 must be locked when it is in place on board the aerial platform. The detection device therefore advantageously comprises a strapping device 104 serving to lock the position of the antenna 101 with respect to the winch 100 so as to prevent an accidental fall of the antenna and the associated consequences.

A prior art strapping device 104 is shown in FIG. 2. It comprises a strap 105 comprising a clamping strip 106 and shoes 114 designed to be interposed between the protective structure 113 and the clamping strip 106. It also comprises a driving device 115 serving to move longitudinal ends 110 and 111 of the clamping strip 106 with respect to one another so as to reduce the size of the loop in order to be able to grip an object, for example the protective structure 113 of the antenna 101, during a so-called clamping step, or to increase the size of the loop in order to be able to unclamp or release an object initially gripped by the strap 105, during a so-called unclamping step.

Each end 110 and 111 of the clamping strip 106 is rigidly connected to a nut 121 and 122, respectively, in terms of translation with respect to the threaded rod 118 along the axis x. The nuts are engaged with screw threads of the threaded rod which screw threads are produced with opposite hand so that clamping and unclamping are achieved by the movement of the ends of the clamping strip 106 in opposite directions along the longitudinal axis of a threaded rod 118. The rotational driving of the threaded rod 118 may be achieved by a motor, not shown, or by an operator by means of a knob, via gearing, not shown.

The clamping of the strip 106 needs to be limited in order to avoid damaging the antenna or damaging the screw-nut system or, more simply, to allow unclamping. Specifically, excessive clamping may lead to the nut becoming jammed on the threaded rod, requiring the application of excessive torque in order to free the antenna. It is possible to limit the travel both on clamping and on unclamping.

In order to limit the travel of the nuts, the driving device comprises a control member for controlling the motor, and two position sensors for detecting the limit loop sizes in the clamping and unclamping directions. The control member stops the motor after detection of limit loop sizes.

As may be seen in FIG. 2, each position sensor comprises a push-button switch 123 and 124 fixed to the frame 109, and an actuator, in the form of a stop 125 and 126, respectively, fixed to one of the nuts 121 and 122 respectively. The stop 125 comes to bear against the push-button 127 of the switch 123 and pushes it perpendicular to the axis x of the threaded rod 118, so as to close the switch 123 when, during the unclamping phase, the size of the loop reaches a threshold value that corresponds to a threshold position of the nut 121 along the threaded rod 118 in unclamping. The stop 126 comes to bear against the push-button 128 and pushes it perpendicular to the axis x of the threaded rod 118, so as to close the switch 124 when, during the clamping phase, the size of the loop reaches another threshold value that corresponds to a threshold position of the nut 122 along the threaded rod 118 in clamping. Ramps pivoting about axes perpendicular to the plane of FIG. 2 are provided at the interface between each push-button 127 or 128 and its stop 125 or 126 so as to avoid damage to the push-button 127 or 128.

Now, the Applicant Company has found that the sensors lose their calibration during operation, with the consequence of altering the detected threshold size values and leading to excessive clamping and/or unclamping that may damage the driving device and the antenna. In order to avoid these excesses, the sensors need to be regulated prior to each operation.

SUMMARY OF THE INVENTION

It is one object of the invention to propose a driving device comprising a position sensor able to detect a predetermined position more reliably.

To this end, one subject of the invention is a driving device comprising:
- a frame,
- a screw-nut system comprising a threaded rod and a first nut helicoidally connected to the threaded rod, the threaded rod being connected to the frame by a pivot connection that allows the threaded rod to rotate with respect to the frame about a longitudinal axis of the threaded rod,
- a first position sensor making it possible to detect a limit position of the first nut along the longitudinal axis, the first position sensor comprising a first part and a second part, the first position sensor being sensitive to a variation in a distance between the first part and the second part of the first position sensor along the axis,
- the first part being fixed to the first nut and the second part being connected to the threaded rod without passing via the pivot connection and in such a way that rotation of the threaded rod about the longitudinal axis leads to a variation in the distance between the first part and the second part of the first position sensor along the longitudinal axis.

Advantageously, the device comprises at least one of the below features considered alone or in combination:
- the second part of the first sensor is helicoidally connected to the threaded rod,
- the screw-nut system comprises a second nut in helicoidal connection with the threaded rod, the first nut being engaged with a first screw thread of the threaded rod and the second nut being engaged with a second screw thread of the threaded rod, the first screw thread and the second screw thread being produced with opposite hand, the driving device comprising a second position sensor making it possible to detect a limit position of the second nut along the longitudinal axis with respect to the frame, the second position sensor comprising a first part and a second part, the second position sensor being sensitive to a variation in the distance between the first part and the second part of the second position sensor along the axis,
- the first part of the second position sensor being fixed to the second nut and the second part of the second position sensor being connected to the threaded rod without passing via the pivot connection and in such a way that rotation of the threaded rod about the longitudinal axis leads to a variation in the distance between the first part and the second part of the second position sensor along the longitudinal axis,
- the first screw thread and the second screw thread have the same pitch referred to as the first pitch,
- the second part of the second sensor is helicoidally connected to the threaded rod,
- the second part of the two sensors is engaged with the one same additional screw thread,
- the second screw thread has a second pitch, the additional screw thread being produced with the same hand as the second screw thread and having a third pitch different from the second pitch,
- the additional screw thread is interposed between the first screw thread and the second screw thread and has a third pitch longer than the first pitch,
- the first part and the second part of the first sensor comprise a push-button switch and an actuator for actuating a push-button of the push-button switch in order to bring about a change in state of the switch,
- the first position sensor is configured to be sensitive to a variation in distance between its first part and its second part along the axis x, but not to a variation in relative angular position between its first part and its second part about the axis x,
- the push-button is in a sliding connection parallel to the longitudinal axis with a fixed part of the switch and the stop extends in a plane substantially perpendicular to the longitudinal axis,
- it comprises a motor coupled to the threaded rod in order to allow the threaded rod to be rotationally driven about its longitudinal axis,
- it comprises a control member making it possible to control the motor, the control member receiving measurements emanating from the first position sensor and being able to control the motor on the basis of the measurements,
- the control member receives measurements emanating from the second position sensor, the control device being configured to stop the motor as soon as the limit position of the first nut is detected when the threaded rod is rotating in a first direction, and, after a delay, following detection of the limit position of the second nut, when the threaded rod is rotating in the opposite direction.

The invention also relates to a strapping device for binding an object by means of a strap comprising a clamping strip comprising a first end and a second end and forming a loop that is intended to surround the object, the strapping device comprising a driving device according to the invention, allowing the two ends to move with respect to one another so as to enlarge or decrease the size of the loop, the first end of the strap being rigidly connected to the first nut in terms of translation along the axis of the threaded rod.

Advantageously, the second end is rigidly connected to the second nut in terms of translation along the axis of the threaded rod.

The loop may be closed.

The invention also relates to a holding device for clamping a hollow object, said device comprising a first pad and a second pad which are capable of pressing against a hollow object, on the interior of the hollow object, the holding device comprising a driving device according to the invention, the driving device being configured to move the two pads in relation to one another so as to move them away from one another in order to clamp the object or to move them closer together in order to release the object, the first pad being rigidly connected to the first nut in terms of translation along the axis of the threaded rod, the screw-nut system comprising a second nut engaged with a second screw thread which is formed with the opposite hand to the first thread, the second pad being rigidly connected to the second nut in terms of translation along the axis of the threaded rod.

BRIEF DESCRIPTION OF THE DRAWINGS

The invention will be better understood on studying a few embodiments described by way of completely non-limiting example and illustrated by appended drawings, in which.

DETAILED DESCRIPTION

From one figure to another, the same elements are denoted using the same reference numbers.

Figure 1:
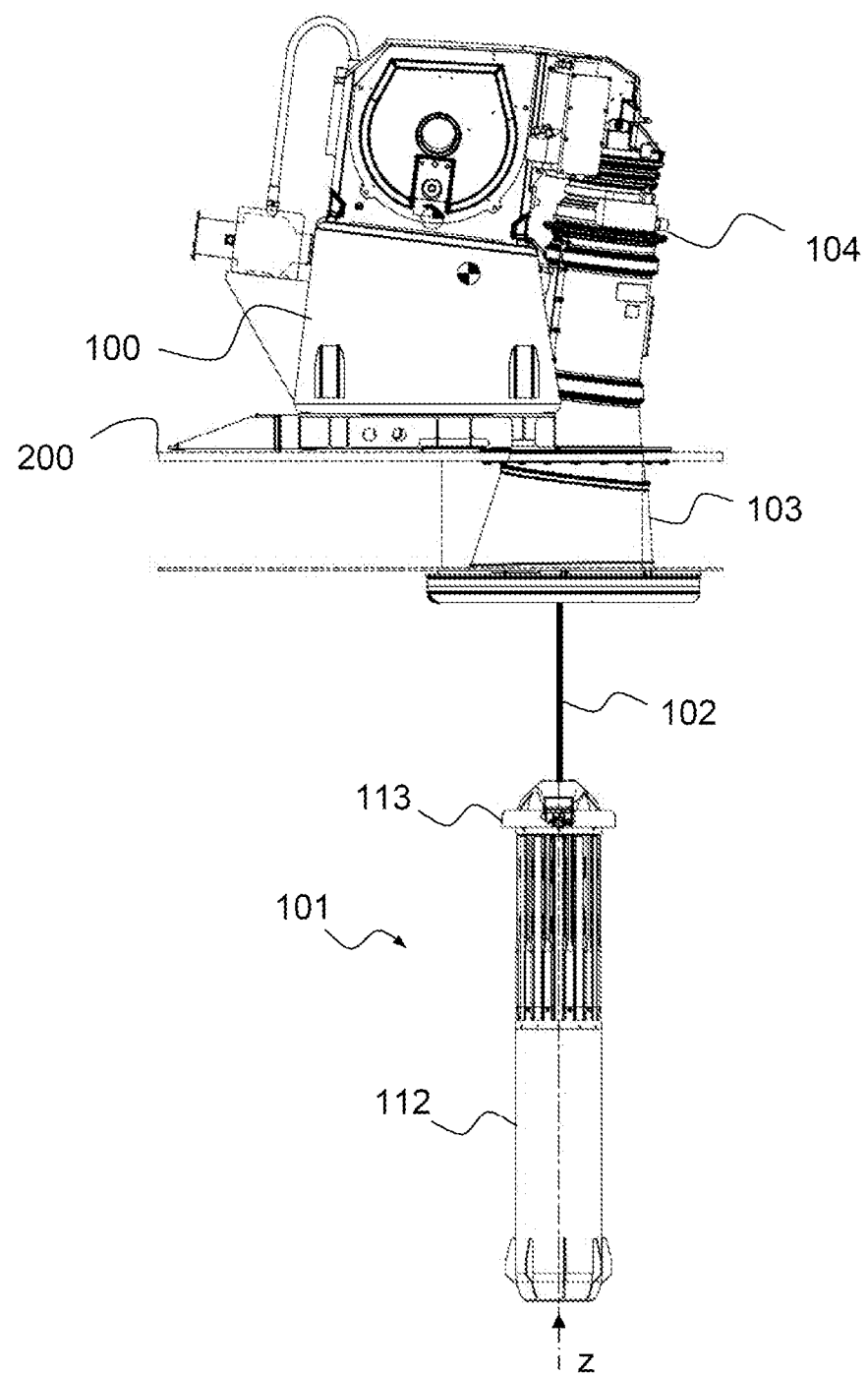
FIG. 1, which has already been described, shows, schematically, a detection device.
Figure 2:
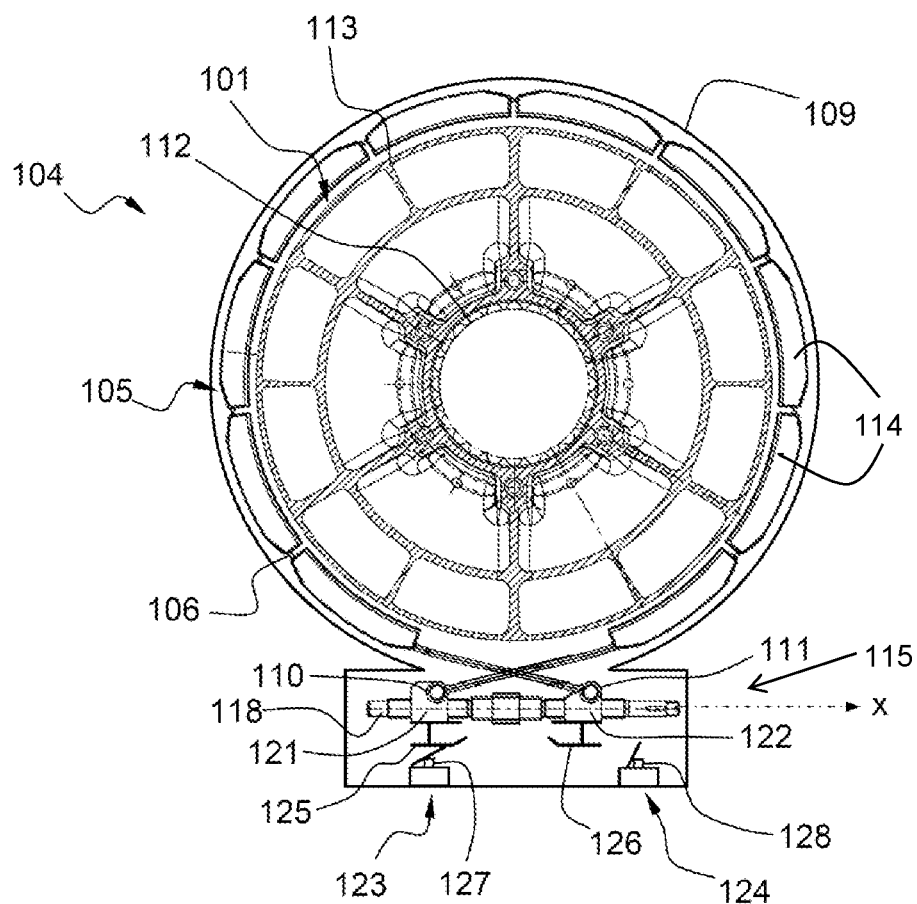
FIG. 2 shows a schematic cross section of a strap encircling an antenna and of a driving device of the prior art, FIG. 3 schematically shows a strapping device according to the invention, FIGS. 4 and 5 schematically show the driving device in greater detail in cross section (FIG. 4) and in perspective (FIG. 5)

The invention relates to a driving device with a screw-nut system. This device can be used in a strapping device 4 intended to be incorporated into an airborne warfare device or detection device as shown in FIG. 1. The strapping device 4 therefore replaces the strapping device 104. The invention also relates to the strapping device 4 and the detection device as shown in FIG. 1, comprising the strapping device 4 according to the invention. The strapping device 4 may more generally be used to grip any type of object, preferably one with a circular cross section.

The driving device with a screw-nut type system may be used for devices other than the strapping devices that require a nut to be driven along a threaded rod and detection of a position of the nut along the screw. By way of example, the driving device can be implemented in a machine tool in which a plate is being translationally moved. Use of the invention is of benefit in detecting a position of the plate.

Figure 3:
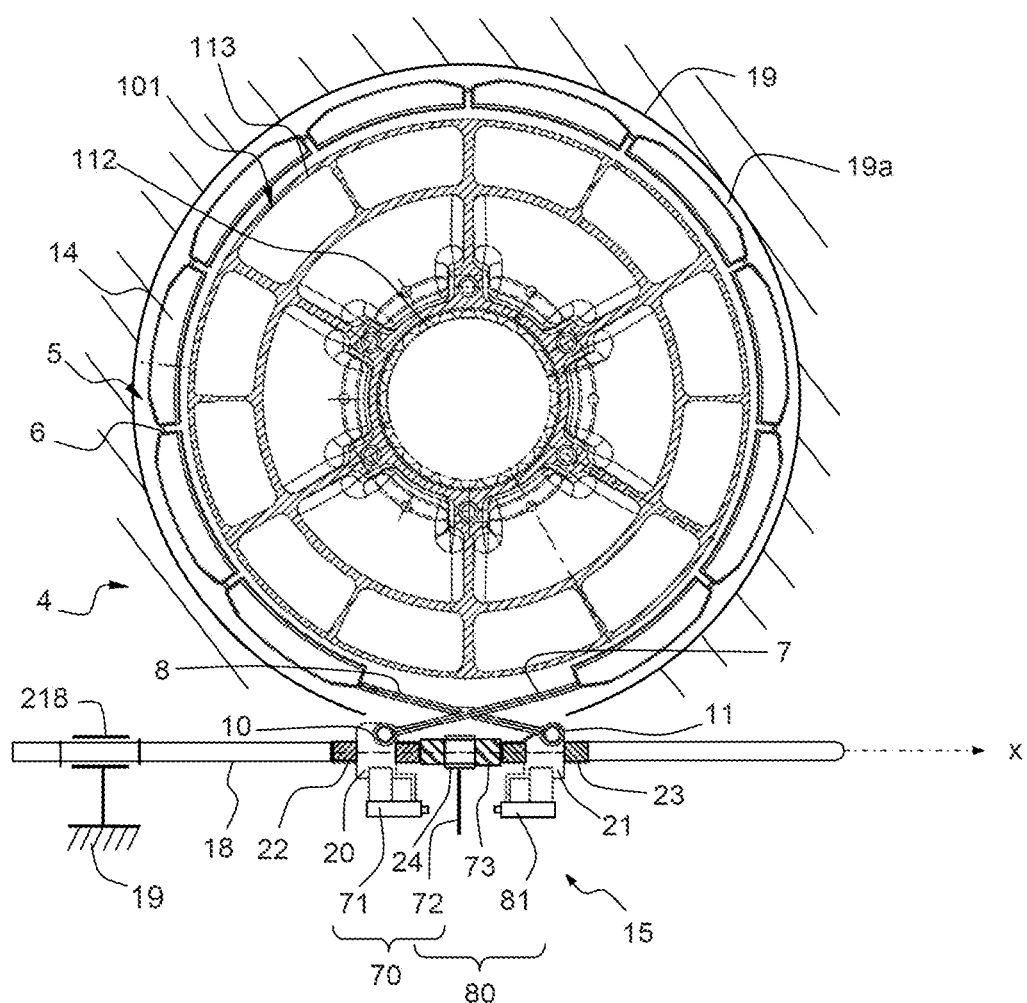

As visible in FIG. 3, the strapping device 4 according to the invention comprises a strap 5 designed to bind an object, for example an antenna 101 and, more specifically, its protective bumper 113, for example of essentially circular cross section, and allowing the object to be gripped or released. The strap 5 comprises a clamping strip 6 forming a loop intended to bind the object 101. The clamping strip 6 comprises two longitudinal ends 10 and 11.

The strapping device 4 also comprises a clamping/unclamping device 15 or driving device serving to move ends 10 and 11 of the clamping strip 6 with respect to one another so as to reduce the size of the loop in order to be able to clamp an object, for example the antenna 101, during a so-called clamping step, or to increase the size of the loop in order to be able to unclamp or release an object initially clamped by the strap 5, during a so-called unclamping step. To vary the size of the loop is to vary the length of the perimeter of the loop, that is to say the diameter of the loop. Shortening of the perimeter of the loop, which arises during clamping, produces a pressure on the object 101 that is to be clamped, and creates an assembly by clamping between the strap 5 and the object 101. In order to maintain the clamping of the object 101, the clamping/unclamping mechanism 15 maintains tensile forces on the free ends of the strap 5. A frame 19 delimits a housing 19a accommodating the strap 5. The housing 19a here has a circular cross section in the axis z (perpendicular to the plane of FIG. 3).

Figure 4:
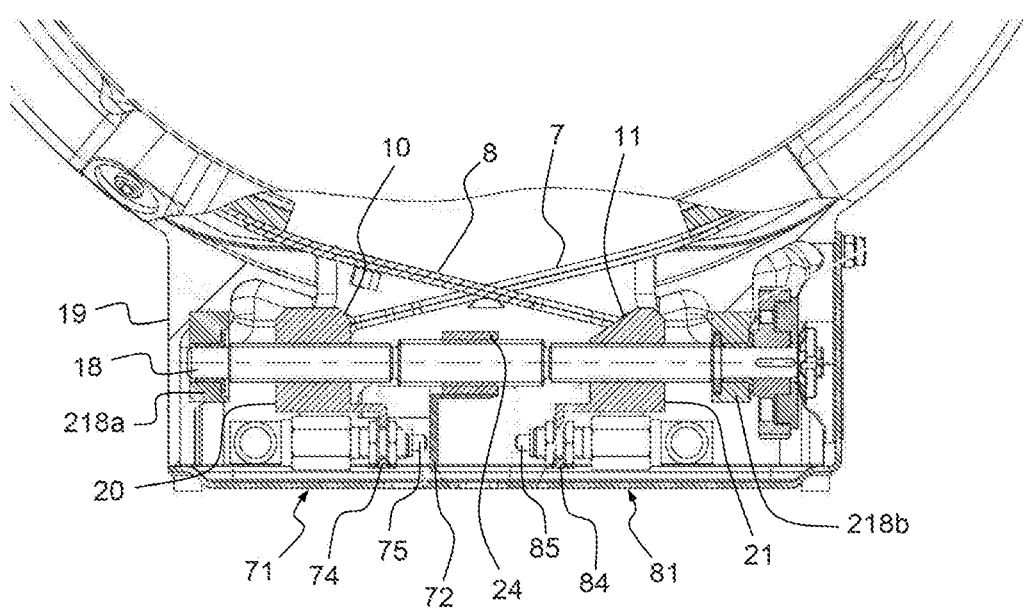

The clamping/unclamping device 15 comprises a screw-nut system comprising a threaded rod 18 and at least one nut 20. More precise views of the driving device 15 are shown in FIG. 4 (in cross section) and in FIG. 5 (in perspective).

The threaded rod 18 is connected to the frame 19 by a pivot connection 218 visible in FIG. 3, allowing the threaded rod 18 to rotate with respect to the frame 19 about a longitudinal axis x of the threaded rod 18. The connection 218 is formed for example by two plain bearings produced respectively in two plates 218a, 218b rigidly connected to the frame 19, visible in FIG. 4, and spaced apart along the axis x. The connection 218 may be achieved in a different way, for example by means of one or two rolling bearings.

Figure 5:
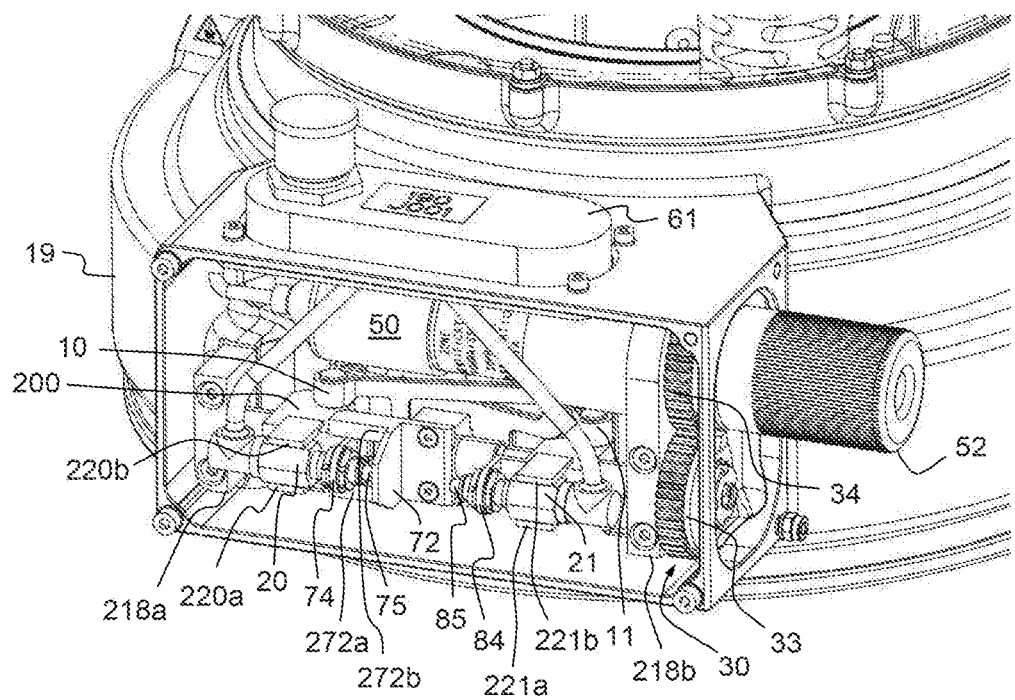

The screw-nut system also comprises a first nut 20 connected in a helicoidal connection to the threaded rod 18 and to the frame 19 by a connection that prevents the nut from rotating with respect to the frame 19 about the axis x. In FIG. 5, plates 220a and 220b, which are parallel to one another and to the axis of the rod 18, are positioned on either side of the nut 20 so as to clamp the nut 20. The screw-nut system comprises a second nut 21 connected in a helicoidal connection to the threaded rod 18 and connected to the frame 19 by a connection 221a, 221b that prevents the nut 21 from rotating with respect to the frame 19 about the axis x. In FIG. 5, plates 221a and 221b, which are parallel to one another and to the axis of the rod 18, are positioned on either side of the nut 21 so as to clamp the nut 21. The plates 220a, 220b and 221a and 221b are pivotably connected (about an axis perpendicular to the axis x) to the ends 10 and 11, respectively, of the clamping strip 6 which ends are themselves prevented from rotating with respect to the frame 19 about the axis x by the clamping strip 6 being immobilized in the housing 19a.

The nut 20 is engaged with a first screw thread 22 of the threaded rod 18, shown schematically in FIG. 3, and the nut 21 is engaged with a second screw thread 23 of the threaded rod 18. The screw threads 22 and 23 are produced with opposite hand and may have the same pitch. Different pitches are equally possible. The first end 10 of the clamping strip 6 is rigidly connected to the nut 20 in terms of translation with respect to the frame 19 along the axis x, and the second end 11 of the clamping strip 6 is rigidly connected to the nut 21 in terms of translation with respect to the frame 19 along the axis x. As a result, the screw-nut system is configured to move the two ends of the clamping strip 10 and 11 in opposite directions parallel to the axis x with respect to the frame 19 when the threaded rod 18 is rotated about its axis in one direction (clamping) and in the opposite direction (unclamping). The ends 10 and 11 move closer together during unclamping and move further apart during clamping. In the embodiment in the figures, each end 10 and 11 is in a pivot connection with a nut 20 and 21 respectively, about an axis perpendicular to the plane of the loop formed by the clamping strip 6. As an alternative, the ends 10 and 11 may be rigidly connected to the respective nuts 20 and 21, namely fixed to the nuts or of one-piece with the nuts.

In the embodiment of the figures, the screw-nut system comprises two nuts 20 and 21 each connected to a respective end 10 and 11. As an alternative, it comprises a single nut helicoidally connected to the threaded rod 18 and immobile in terms of rotation about the axis x with respect to the frame 19 and rigidly connected to one of the ends of the clamping strip in terms of translation with respect to the frame along the axis x so as to be able to drive this end along the axis x with respect to the frame. The other end is, for example, fixed to the frame 19.

As can be seen in FIG. 5, the clamping/unclamping device comprises a gearset 30 comprising two gear wheels 33, 34 engaged with one another for driving the rotation of the screw. A motor 50 (shown in FIG. 5) is able to drive the rotation of the wheel 34. The gearset 30 transmits this rotational movement to the threaded rod 18 via the wheel 33. The motor 50 is, for example, coupled to the wheel 34 by means of reduction gearing, not shown.

The driving device 15 comprises a control member 61 for controlling a motor 50. This member controls the motor on the basis of information emanating from the position sensors 70, 80 shown in FIG. 3. Each position sensor 70 or 80 is able to detect a predetermined position of a nut 20 or 21 with respect to the threaded rod 18 along the longitudinal axis x corresponding to a given size of the loop. The sensor 70 is configured to detect a limit position of the nut 20 relative to the threaded rod 18 along the axis x corresponding to a limit unclamping loop size. The sensor 80 is configured to detect a limit position of the nut 21 relative to the threaded rod 18 along the axis x corresponding to a limit clamping loop size. The limit positions of the two nuts along the axis x are different.

The control member 61 is configured to stop the motor 50 when the limit unclamping size is reached while the threaded rod 18 is rotating in a direction corresponding to unclamping and when the limit clamping size is reached while the threaded rod 18 is rotating in the opposite direction. These stoppages may be instantaneous or delayed as we shall see later.

As visible in FIG. 3, each sensor 70 or 80 comprises two parts of which a first part 71 or 81 is fixed to the corresponding nut 20 or 21 respectively. In other words, each first part 71 and 81 is helicoidally connected to the threaded rod 18 via one of the nuts 20 and 21 respectively.

Each sensor comprises a second part 72 which in this instance is common to the two sensors 70 and 80 and forms a plate perpendicular to the axis x which plate will be described more specifically later on. The second part 72 is mounted in such a way that the rotation of the threaded rod 18 about a longitudinal axis x of the threaded rod 18 leads to a variation in distance between the first part 71 or 81 and the second part 72 of the position sensor 70 or 80 respectively, along the longitudinal axis x of the threaded rod 18, the position sensor 70 or 80 respectively being configured in such a way as to be sensitive to this variation in distance.

According to the invention, as visible in FIG. 3, the second part 72 is connected to the threaded rod 18 without passing via the pivot connection 218 shown in FIG. 3. Specifically, the pivot connection 218 has axial play along the axis x. This is an imperfect pivot connection. With the setup according to the invention, the play in this highly stressed connection 218 has no impact on the regulation of the sensor which therefore has the advantage of being stable, accurate and under control. The play in the pivot connection 218 between the two parts of each sensor 70, 80 is saved.

In the embodiment shown in the figures, the part 72 is helicoidally connected to the threaded rod 18 and is connected to the frame 19 by a connection that prevents the part 72 from rotating with respect to the frame 19. This is achieved by means of two prongs 272a, 272b visible in FIG. 5, extending longitudinally along the axis x, and spaced apart along an axis perpendicular to the axis x in such a way as to clamp a block 200 rigidly connected to the plates 220a and 220b which are themselves prevented from rotating with respect to the frame 19 about the axis x.

The part 72 is therefore engaged with a screw thread 73, indicated schematically in FIG. 3, of the threaded rod via a nut 24.

As an alternative, one part of the two parts of a position sensor can be connected to the threaded rod 18 by rendering it immovably attached to the threaded rod 18, or alternatively by fixing it to the threaded rod 18 in terms of translation along the axis x and by fixing it to the frame 19 in terms of rotation about the axis x. These connections do not pass via the pivot connection 218.

In the nonlimiting embodiment of the figures, as visible in FIG. 4, the first part 71, 81 of each sensor is a push-button switch. The second part 72 is an actuator produced, in this instance, in the form of a stop. The actuator 72 allows the push-button 75 or 85 to be actuated in order to bring about a change in state of the switch. Each switch is able to be either in a closed state, or in an open state. A change in state of the switch corresponds to a transition from the open state to the closed state, or vice versa.

The first switch 71 and its actuator 72 are configured and arranged in such a way that the first actuator 72 brings about a change in state of the first switch 71 when the first nut 20 reaches its limit position with respect to the threaded rod 18 along the axis x. This limit position corresponds to the limit unclamping size of the loop. The second switch 81 and the second actuator 72 are configured and arranged in such a way that the second actuator 72 brings about a change in state of the second switch 81 when the second nut 21 reaches its limit position with respect to the threaded rod 18 along the axis x. This position corresponds to the limit clamping size of the loop. The change-of-state information for each switch is transmitted to the control member 61.

The push-button switch 71 or 81 is fixed to a nut 20 or 21. The push-button switch 71 or 81 comprises a fixed part 74 or 84 rigidly connected to the nut 20 or 21. The fixed part 74, 84 comprises a circuit, not shown. The switch comprises a push-button 75 or 85, able to move translationally with respect to the fixed part 74 or 84. The fixed part 74 or 84 comprises a contact of the normally-open type. The push-button 75 or 85 may come into physical contact with a circuit of the fixed part in order to close the circuit. The switch then transitions into the closed state. The switch is open when the push-button is distant from the circuit. As an alternative, at least one switch has a contact of the normally-closed type.

The push-buttons 75 and 85 are capable of translational movement with respect to the respective fixed parts 74 and 84 substantially parallel to the axis x. In other words, each push-button 75 or 85 is in a sliding connection with its nut 20 or 21 parallel to the axis x. Each push-button 75 or 85 is interposed between the contact of its switch 71 or 81 and the stop 72 along the axis x. the push-button 75 or 85 will therefore close the switch 71, 81 when the stop 72 comes closer to the fixed part 74 or 84 and will push the push-button 75 or 85 until it makes contact.

As visible in FIG. 3, the stop 72 is engaged with a screw thread 73 of the threaded rod which screw thread is of the same hand as the screw thread 23 (engaged with the nut 21) but of opposite hand to the screw thread 22 (engaged with the nut 20). The screw thread 73 has a different pitch from the screw thread 23 so as to be able to cause the two parts 72 and 71 to move closer together at least when the threaded rod is rotating in one direction. In the nonlimiting example of the figures, the screw threads 22 and 23 have a pitch of 1.5 mm/turn, the screw thread 73 has a pitch of 1.75 mm.

The operation of the device is as follows. Starting from an initial position in which the central nut 24 (or the stop 72)

is in a central position, the clamping strip 6 is in an intermediate position somewhere between clamped and unclamped. By maneuvering the threaded rod 18 in one direction about the axis x, the stops 20 and 21 move in opposite directions because the screw threads 22 and 23 are produced with opposite hand. If, for example, this is the unclamping direction, the nuts 20 and 21 move closer together, carrying with them the ends 10 and 11 of the clamping strip 6. The size of the loop increases. The stop 72 moves in the opposite direction to the nut 20 and closer thereto. The stop 72 moves toward the push-button 75 at a rate of 3.75 mm/turn. The stop 72 comes into contact with the first push-button 75, moves it, with respect to the fixed part 74, in the direction x and in the sense of direction of movement of the stop 72 and thus brings it into contact with the contact of the switch 71 so as to bring about the change in state of the switch 71. The limit position of the nut 20, along the axis x, relative to the threaded rod 18, corresponding to the limit unclamping size of the loop is therefore detected. This information is sent to the control member 61. Advantageously although not necessarily, the control member 61 is configured to stop the motor 50 as soon as the limit position of the nut 20 is detected when the threaded rod 18 is rotating in the unclamping direction. The strap 6 is, for example, fully retracted into its housing 19a in the frame 19 and must not be retracted any further into it in case it should become jammed therein. Stoppage therefore has to be highly accurate because, for the next recovery of the antenna, it is necessary to be certain that the strapping is open to the maximum but without the risk of jamming. This high relative speed between stop 72 and the first push-button 75 allows for highly precise adjustment. On opening, a well-regulated strap 6 will always be in the same position when it stops moving. As an alternative, the control member 61 stops the motor 50 with a delay after detecting the limit position of the nut 20 during unclamping, namely when the threaded rod 18 is rotating in the direction of clamping.

Now, when the motor 50 causes the threaded rod 18 to rotate in the opposite direction about the axis x, namely in the direction of clamping. The nuts 20 and 21 moving in opposite directions move away from one another and the size of the loop decreases. The stop 72 moves in the same direction as the nut 21 but a little faster because its pitch is 1.75. The stop 72 will therefore catch up with the push-button 85 little by little at a rate of 0.25 mm/turn. The stop 72 ultimately catches up with the push-button 85, moves it translationally along the axis x toward the contact of the fixed part 84, thereby bringing about the change in state of the switch 81. The limit position of the nut 21, relative to the threaded rod 18, along the axis x corresponding to the limit clamping size of the loop is detected. This information is transmitted to the control member 61 which stops the motor in order to stop the clamping, preferably, although not necessarily, with a delay following receipt of the detection information. When the limit clamping size is reached, the motor continues to drive the rod 18 in order to tighten the clamping strip until the loop reaches a predetermined threshold size. This guarantees that the antenna is completely clamped whatever the diameter of the antenna within a predetermined range of diameters. It may be seen that the clamping still enjoys a broad range of uncertainty since the rate of advance of the contact is only 0.25 mm/turn in relative terms. This broad range means that antennas of different diameters can easily be accommodated provided that the delay to actual stoppage of the motor after contact is sufficient. Furthermore, the low relative rate of advance between the two parts of the switch 81 makes it possible not to damage the push-button 85 when the motor is stopped with a delay following detection of the limit clamping position. The push-button 85 continues to be depressed, but at a low speed. The maximum travel of the push-button 85 can therefore be reduced, so the switch is therefore compact. As an alternative, the control member 61 is configured to stop the motor 50 as soon as the information regarding the change in state of the switch 81 is received when the threaded rod is rotating in the clamping direction.

In the non-limiting embodiment of the figures, the sensors 70 and 80 comprise the one same actuator 72 which in this instance is a late extending essentially in a plane perpendicular to the axis x. This stop 72, which is common to the two sensors, is engaged with a screw thread 73 positioned between the other two screw threads 22 and 23. This embodiment is particularly advantageous because it is compact and requires few components.

Advantageously, the pitch of the third screw thread 73 engaged with the stop 72 is longer than the pitch of the second screw thread 23. That makes it possible to ensure that the nut 21 and the stop 72 move closer together when the rod rotates in the clamping direction and further apart when the rod 18 rotates in the opposite direction.

Advantageously, as is the case in the embodiment in the figures, the pitch of third screw thread 73 is longer than that of the first screw thread 22. The rate at which the nut 20 and stop 72 move towards one another when moving in opposite directions is therefore high and allows the movement to stop at precise position.

As an alternative, the second parts of the two sensors are distinct. It is possible for example to provide one stop per sensor. These second parts may then be engaged with different screw threads of the threaded rod. At least one of the sensors may have a second part that is fixed with respect to the threaded rod or at least fixed in terms of translation with respect to the threaded rod. At least one of the second parts is engaged with a screw thread positioned outside the space delimited by the screw threads 22 and 23 along the axis x.

The first part and the second part of at least one sensor may be switched over. For example, the first part of at least one sensor is an actuator and the second part of at least one sensor is a push-button. It is possible, for example, to fix at least one of the two push-button switches to fix the nut 24 and to fix the corresponding actuator to the nut 20 or 21. It is possible for example to fix the two switches to the nut 21 by arranging them in opposite directions along the axis x and to provide two fixed stops for the nuts 20 and 21 respectively.

In the embodiment of the figures, the sensors 70, 80 are of the actuator/push-button switch type. As an alternative, at least one sensor is another type of sensor. This may, for example, be a magnetic sensor, an optical sensor, an inductive-type sensor, a Doppler-effect sensor able to detect a variation in distance between two parts of the sensor along the axis x. However, these sensors require processing in order to detect the desired position. These sensors may also have a second part that is common, or distinct second parts. One sensor may suffice, depending on circumstances.

Advantageously, each sensor, or at least one sensor, is configured and arranged to be sensitive to a variation in distance between its two parts parallel to the axis x but not to a variation in relative angular position between its two parts about the axis x. That makes the regulation of the sensor insensitive to the angular play in the connection of its nut with respect to the frame. Moreover, since only the axial relative movement is taken into consideration, if the parts of a sensor should move tangentially or radially relative to the rod along the axis x (because of the play in the helicoidal connection), this is of absolutely no importance because their relative distance along the axis x does not vary. The solution is therefore highly insensitive to expansions, vibrations, movements, and as long as the regulated distance between the two parts of the position sensors does not vary, the strap will open and tighten in the same way.

This is, for example, the case in the embodiment in the figures, in which each sensor 70 and 80 comprises a stop 72 extending substantially in a plane perpendicular to the axis x and a push-button switch 71 or 81 comprising a push-button 75 or 85 in sliding connection with a nut 20 or 21 respectively, parallel to the axis x. This solution offers the advantage of being compact and simple. It may be achieved using push-buttons of reasonable diameter compatible with the aeronautical field. Moreover, this embodiment does not, as does the prior art, require the installation of a pivoting ramp in order for the driving device to be able, without damage, to tolerate the fixed part of the switch and the stop moving closer together after the closing of the switch. The very nature of the push-button allows this movement. It is therefore possible to dispense with a painstaking step of setting up the ramp and the relative position of the ramp and of the stop along the axis y. This is also for example the case with an optical sensor comprising a source emitting a ray of light parallel to the axis x, a second part in the form of a reflective plate perpendicular to the axis x and a detector capable of detecting a ray reflected by the panel and measuring the difference in a physical parameter between the incident ray and the reflected ray and from this deducing a distance between the plate and the source along the axis x.

As an alternative, the sensor is sensitive to the variation in relative angular position between its two parts about the stop. For example, the position sensors have an arrangement similar to that of the prior art.

The driving device 15 also comprises a knob 52, visible in FIG. 5, secured in rotation to the wheel 33 about its axis of rotation. This knob allows an operator to turn the rod by hand.

Figure 6:
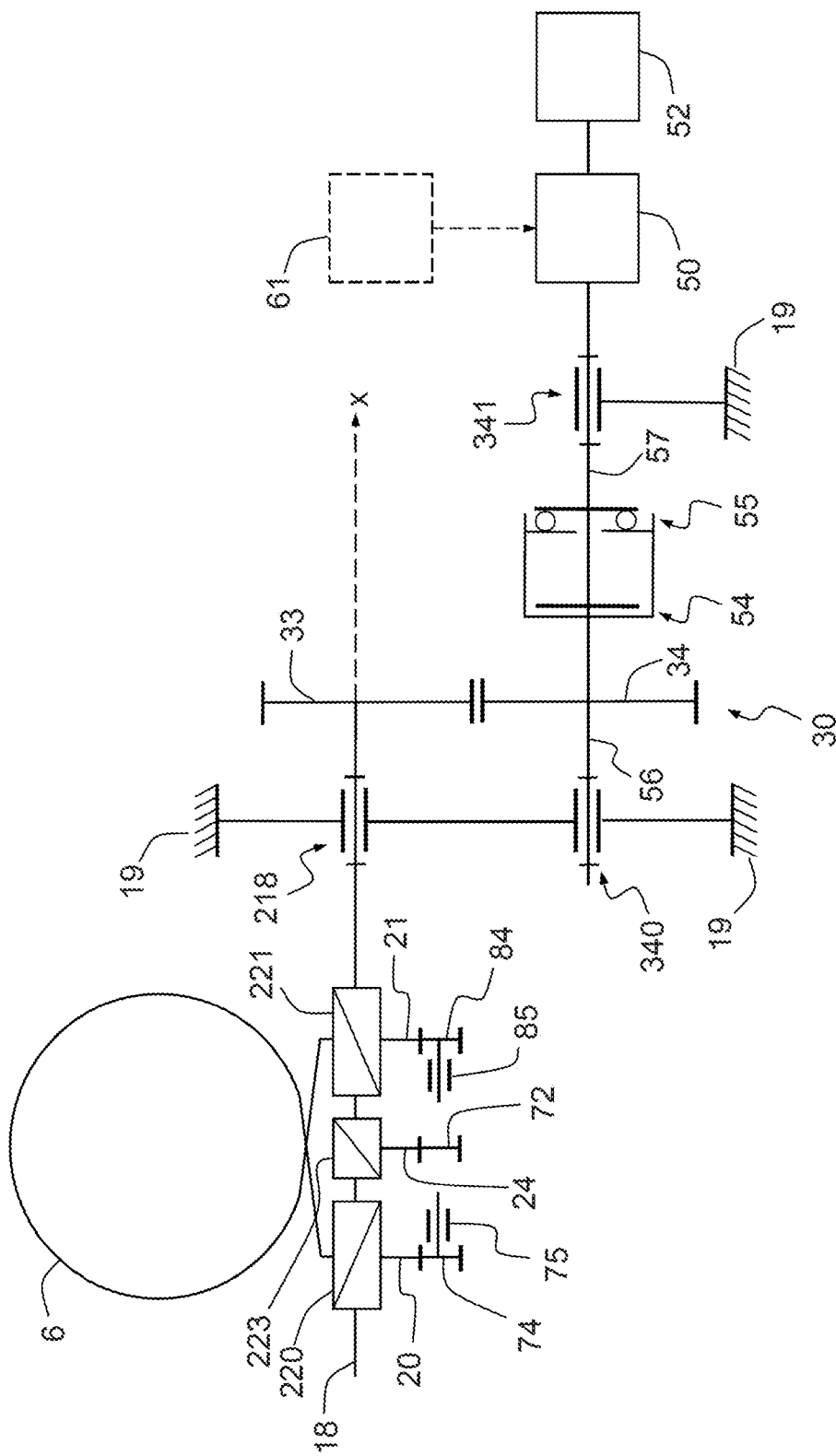
FIG. 6 is a simplified kinematic diagram of the driving device.

FIG. 6 is a simplified kinematic diagram of the driving device. The helicoidal connections 220 and 221 between the respective nuts 20 and 21 and the threaded rod are shown, as are the pivot connections 218 and 340 between the frame 19 and the threaded rod 18 and, respectively, the wheel 34. It will be noted also that the push-buttons 75 and 85 are in sliding connection with the fixed parts 74 and 84 of the respective switches. The connections that prevent the nuts from rotating with respect to the frame are not shown.

Advantageously, as shown in FIG. 6, the driving device 15 comprises a torque limiter 54 configured and arranged in such a way as to eliminate the transmission of torque between the motor 50 and the threaded rod 18 when the torque about the axis of the threaded rod exceeds a predetermined threshold. Advantageously, to complement the torque limiter 54, the movement transmission device comprises a freewheel 55. The torque limiter 54 and the freewheel 55 are configured and arranged in such a way as to make it possible to limit a torque rotating the threaded rod 18 about the axis x in one direction of rotation only in which the freewheel 55 allows rotation and therefore slippage in the torque limiter. In the other direction, the freewheel does not permit any rotation and the torque limiter is unable to act. Advantageously, the direction of rotation in which the torque limiter acts is the direction corresponding to clamping. This device makes it possible to prevent the clamping torque from exceeding a predetermined threshold which is the same regardless of the diameter of the antenna. Delayed stoppage of the motor during clamping makes it possible to guarantee that the torque limiter slips before the motor stops. By contrast, the torque limiter does not come into action in the unclamping direction. Limiting the angular travel of the threaded rod in the clamping direction makes it possible to ensure that an operator or that the motor 50 will be able to re-tighten the clamping strip after unclamping, the torque limiter acting only during clamping.

The motor 50 is coupled to the second wheel 34 by means of the torque limiter 54 and by means of the freewheel 55, if present. The freewheel 55 allows the coupling/uncoupling of two shafts 56 and 57 connected to the frame 19 by pivot connections 340 and 341, respectively. A first shaft 56 is rigidly connected to the wheel 34 and the other 57 is a shaft of the motor 50.

In the embodiment in the figures, the clamping strip 6 forms a closed loop. In other words, the clamping strip comprises two strip strands 7 and 8 referenced in FIG. 4, each comprising one of the two ends 10 and 11 of the clamping strip 6 and crossing one another in such a way that a closed loop intended to completely end circle the object that is to be clamped, namely to make a complete turn around the object, is formed by the clamping strip 6. The use of a strip 6 forming a closed loop by the crossover of two strip strands makes it possible to significantly vary the size of the loop and thus to grip and release objects having different diameters. As an alternative, the clamping strip 6 does not form a closed loop. In that case, its ends move closer together during clamping and further apart during unclamping. In that case, the two ends move closer together during clamping and further apart during unclamping. It is then conceivable to provide second parts, for example stops, that are distinct for the two sensors, engaging with different screw threads positioned on the outside of the space delimited by the two screw threads 22 and 23.

The clamping strip 6 comprises for example a metal ribbon or a strip of plastic material. The perimeter or size of the loop varies, for example, during clamping, by varying the bending of the clamping strip. The strip advantageously has a shape at rest that is such that the central part essentially follows the shape of the perimeter of the object that is to be gripped.

The strap 5 also comprises shoes 14, distributed along the clamping strip in such a way as to be intended to be interposed between the clamping strip 6 and the object 101 that is to be gripped. One shoe, not depicted here, may bear against the two strip strands 7 and 8 so as to be interposed between the two strip strands 7 and 8 and the object that is to be gripped.

The control member 61 may comprise one or more dedicated electronic circuits or a general-purpose circuit. Each electronic circuit may comprise a reprogrammable computing machine (a processor or a microcontroller for example) and/or a computer executing a program comprising a sequence of instructions and/or a dedicated computing machine (for example a set of logic gates such as an FPGA, a DSP or an ASIC, or any other hardware module).

Figure 7:
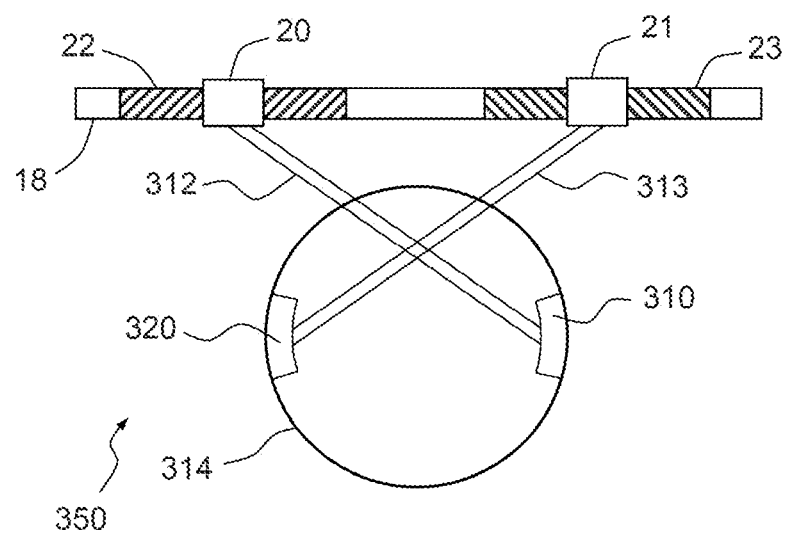
FIG. 7 shows a partial view of a holding device according to the invention.

The driving device according to the invention may be incorporated into another type of holding device 350 as shown in FIG. 7 of the type comprising two pads 310 and 320 intended to hold or release an object. For greater clarity, only the threaded rod (without the third screw thread), the nuts, the pads and the bars 312, 313 have been depicted, but the driving device is a driving device according to the invention. The pads 310 and 320 are respectively fixed in terms of translation along the axis x to the nut 20 and to the nut 21 via bars 312 and 313 respectively, which intersect. When the rod 18 is rotating in one direction, the nuts 20 and 21 move closer together and the pads 310, 320 move further apart so as to come to bear against a hollow body 314, for example of cylindrical cross section, on the inside of the hollow body so as to apply forces in opposite directions parallel to the axis x, for example opposing forces, to the hollow body in order to clamp the body. These forces are advantageously radial, along one and the same radial axis defined for a circular cross section of a hollow body. When the threaded rod 18 rotates in the opposite direction, the nuts move apart and the pads move closer together so as to move away from the hollow body and release same. As an alternative, the direction in which the pads move is that of the nuts. For example, the bars 312 and 313 do not intersect. For greater clarity, only the two screw threads 22 and 23 of the threaded rod are depicted in FIG. 7. The other elements of the driving device are not shown; for greater clarity, the sensors and the third screw thread are not shown in FIG. 6. Advantageously, the torque limiter 54 and the freewheel 55, if present, are arranged in such a way as to make it possible to limit a torque rotating the threaded rod 18 about the axis x in one direction of rotation, and possibly in this direction only. This direction of rotation is the direction corresponding to clamping, namely the direction of rotation that causes the two pads to move further apart and therefore causes the two nuts to move closer together.

The invention claimed is:

1. A driving device comprising:
   a frame; and
   a screw-nut system comprising:
      a threaded rod connected to the frame by a pivot connection that allows the threaded rod to rotate with respect to the frame about a longitudinal axis of the threaded rod, the threaded rod comprises a first thread and an additional thread having a pitch that is different from a pitch of the first thread;
      a first nut helicoidally connected to the first thread of the threaded rod; and
      an additional nut helicoidally connected to the additional thread;
   a first position sensor configured to detect a limit position of the first nut along the longitudinal axis, the first position sensor comprising a first part and a second part, the first position sensor being sensitive to a variation in a distance between the first part and the second part of the first position sensor along the longitudinal axis,
   wherein the first part of the first position sensor comprises a first push-button switch being fixed to the first nut and the second part being fixed to the additional nut and thereby being connected to the threaded rod without passing via the pivot connection and in such a way that rotation of the threaded rod about the longitudinal axis leads to the variation in the distance between the first part and the second part of the first position sensor along the longitudinal axis; and
   wherein the second part of the first position sensor comprises an actuator for actuating a push-button of the first push-button switch in order to bring about a change in state of the first push-button switch, the actuator forming a stop configured to move closer to the push-button of the first push-button switch when the threaded rod is rotated in a first direction, such that the stop is operable to change a state of the first push-button switch when the stop contacts the push-button of the first push-button switch.

2. The driving device as claimed in claim 1, wherein the second part of the first position sensor is helicoidally connected to the threaded rod.

3. The driving device as claimed in claim 1,
   wherein the screw-nut system comprises a second nut in helicoidal connection with the threaded rod, the first nut being engaged with a first screw thread of the threaded rod and the second nut being engaged with a second screw thread of the threaded rod, the first screw thread and the second screw thread being produced with opposite hand,
   wherein the driving device comprises a second position sensor configured to detect a limit position of the second nut along the longitudinal axis with respect to the frame, the second position sensor comprising a first part and a second part, the second position sensor being sensitive to a variation in a distance between the first part and the second part of the second position sensor along the longitudinal axis,
   wherein the first part of the second position sensor comprises a second push-button switch being fixed to the second nut and the second part of the second position sensor being connected to the threaded rod without passing via the pivot connection and in such a way that rotation of the threaded rod about the longitudinal axis leads to the variation in the distance between the first part and the second part of the second position sensor along the longitudinal axis, and
   wherein the second part of the first sensor is integrated with the second part of the second sensor.

4. The driving device as claimed in claim 3, wherein the first screw thread and the second screw thread have the same pitch referred to as the first pitch.

5. The driving device as claimed in claim 3, wherein the second part of the second position sensor is helicoidally connected to the threaded rod.

6. The driving device as claimed in claim 5, wherein the second part of the first position sensor is helicoidally connected to the threaded rod, and wherein the second part of the first position sensor and the second part of the second position sensor are engaged with the additional thread.

7. The driving device as claimed in claim 6, wherein the second screw thread has a second pitch, the additional thread being produced with the same hand as the second screw thread and having a third pitch different from the second pitch.

8. The driving device as claimed in claim 4, wherein the additional thread is interposed between the first screw thread and the second screw thread and has a third pitch longer than the first pitch.

9. The driving device as claimed in claim 1, wherein the second part of the first position sensor comprises an actuator for actuating a push-button of the first push-button switch in order to bring about a change in state of the first push-button switch.

10. The driving device as claimed in claim 1, wherein the first position sensor is configured to be sensitive to a variation in distance between its first part and its second part along the longitudinal axis, but not to a variation in relative angular position between its first part and its second part about the longitudinal axis.

11. The driving device as claimed in claim 10, wherein the second part of the first position sensor comprises an actuator for actuating a push-button of the first push-button switch in order to bring about a change in state of the first push-button switch, and wherein the push-button is in a sliding connection parallel to the longitudinal axis with a fixed part of the switch and a stop extends in a plane substantially perpendicular to the longitudinal axis.

12. The driving device as claimed in claim 1, further comprising a motor that is coupled to the threaded rod to allow the driving of the threaded rod so that it rotates about its longitudinal axis.

13. The driving device as claimed in claim 12, further comprising a control member making it possible to control the motor, the control member receiving measurements emanating from the first position sensor and being able to control the motor on the basis of the measurements.

14. The driving device as claimed in claim 13,
wherein the first screw thread and the second screw thread have the same pitch referred to as the first pitch,
wherein the second part of the second position sensor is helicoidally connected to the threaded rod,
wherein the second part of the first position sensor is helicoidally connected to the threaded rod, and wherein the second part of the first position sensor and the second part of the second position sensor are engaged with the additional thread,
wherein the second screw thread has a second pitch, the additional thread being produced with the same hand as the second screw thread and having a third pitch different from the second pitch,
wherein the additional thread is interposed between the first screw thread and the second screw thread and has a third pitch longer than the first pitch,
wherein the additional thread is interposed between the first screw thread and the second screw thread and has a third pitch longer than the first pitch, and wherein the control member receives measurements emanating from the second position sensor, the control device being configured to stop the motor as soon as the limit position of the first nut is detected when the threaded rod is rotating in a first direction, and, after a delay, following detection of the limit position of the second nut, when the threaded rod is rotating in the opposite direction.

15. A strapping device for binding an object by means of a strap comprising a clamping strip comprising a first end and a second end and forming a loop that is intended to surround the object, the strapping device comprising a driving device as claimed in claim 1, allowing the two ends to move with respect to one another so as to enlarge or decrease the size of the loop, the first end of the strap being rigidly connected to the first nut in terms of translation along the longitudinal axis.

16. A strapping device for binding an object by means of a strap comprising a clamping strip comprising a first end and a second end and forming a loop that is intended to surround the object, the strapping device comprising a driving device as claimed in claim 3, allowing the two ends to move with respect to one another so as to enlarge or decrease the size of the loop, the first end of the strap being rigidly connected to the first nut in terms of translation along the longitudinal axis and wherein the second end is rigidly connected to the second nut in terms of translation along the longitudinal axis.

17. The strapping device as claimed in claim 15, wherein the loop is closed.

18. A holding device for clamping a hollow object, said device comprising a first pad and a second pad which are capable of pressing against a hollow object, on the interior of the hollow object, the holding device comprising a driving device as claimed in claim 1, the driving device being configured to move the two pads in relation to one another so as to move them away from one another in order to clamp the object or to move them closer together in order to release the object, the first pad being rigidly connected to the first nut in terms of translation along the longitudinal axis, the screw-nut system comprising a second nut engaged with a second screw thread which is formed with opposite hand to the first screw thread, the second pad being rigidly connected to the second nut in terms of translation along the longitudinal axis.

19. The driving device as claimed in claim 1, wherein the second part of the first sensor forms a plate extending from the additional nut in a direction substantially perpendicular to the longitudinal axis of the threaded rod.

* * * * *